United States Patent
Liu et al.

(10) Patent No.: US 11,489,917 B2
(45) Date of Patent: *Nov. 1, 2022

(54) METHOD AND SYSTEM FOR BACKING UP AND RESTORING DATA

(71) Applicant: EMC IP Holding Company LLC, Hopkinton, MA (US)

(72) Inventors: Ried Ruifang Liu, Beijing (CN); Colin Yong Zou, San Jose, CA (US); Man Lv, Beijing (CN); Tao Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/307,227

(22) Filed: May 4, 2021

(65) Prior Publication Data

US 2021/0258379 A1    Aug. 19, 2021

Related U.S. Application Data

(62) Division of application No. 15/996,568, filed on Jun. 4, 2018, now Pat. No. 11,025,717.

(30) Foreign Application Priority Data

Jun. 2, 2017 (CN) .............................. 201710409481

(51) Int. Cl.
  *H04L 67/1095* (2022.01)
  *H04L 67/1097* (2022.01)
  (Continued)

(52) U.S. Cl.
  CPC .......... *H04L 67/1095* (2013.01); *G06F 3/065* (2013.01); *G06F 11/14* (2013.01); *H04L 67/1097* (2013.01)

(58) Field of Classification Search
  CPC . H04L 67/1095; H04L 67/1097; G06F 3/065; G06F 11/14
  See application file for complete search history.

(56) References Cited

U.S. PATENT DOCUMENTS 6,671,820 B1 * 12/2003 Kelman .............. G06F 11/1469
                                                      714/E11.122
7,069,307 B1    6/2006 Lee et al.
(Continued)

FOREIGN PATENT DOCUMENTS

| CN | 101000571 | 7/2007 |
| CN | 105760251 | 7/2016 |
| EP | 2879060 | 6/2015 |

*Primary Examiner* — Jeong S Park
(74) *Attorney, Agent, or Firm* — BainwoodHuang

(57) ABSTRACT

A method and system for backing up and restoring data includes: determining, at a server storage area network (SAN) node, an LUN required for protection within a server SAN node based on communication between a backup agent and a logic unit number (LUN) agent in the server SAN node; determining a target backup device based on communication between the backup agent and respective target agent of a plurality of backup devices, the plurality of backup devices being connected with the server SAN node; and transmitting a virtual disk control command to the target backup device in response to the backup or restoration being triggered, such that data in the LUN required for protection is backed up to the target backup device or restored from the target backup device via an activated virtual disk interface of the target backup device.

19 Claims, 11 Drawing Sheets

(51) Int. Cl.
  *G06F 11/14* (2006.01)
  *G06F 3/06* (2006.01)

(56) References Cited

U.S. PATENT DOCUMENTS

| | | |
|---|---|---|
| 7,328,223 B2 | 2/2008 | Nakamichi et al. |
| 7,356,574 B2 | 4/2008 | Demmon |
| 9,063,896 B1 | 6/2015 | Madnani et al. |
| 9,582,219 B2 | 2/2017 | Beam et al. |
| 9,645,950 B2 | 5/2017 | Clark |
| 9,665,306 B1 | 5/2017 | Patwardhan |
| 10,061,660 B1 * | 8/2018 | Jagannatha ......... G06F 11/1464 |
| 10,289,320 B1 | 5/2019 | Wigmore |
| 10,496,599 B1 | 12/2019 | Haravu et al. |
| 10,740,192 B2 | 8/2020 | Bono |
| 10,896,200 B1 | 1/2021 | Suresh et al. |
| 11,025,717 B2 * | 6/2021 | Liu ........................ G06F 3/065 |
| 2004/0093361 A1 * | 5/2004 | Therrien ............. G06F 11/1448 |
| 2004/0260965 A1 * | 12/2004 | Kelman .............. G06F 11/1469 |
| | | 714/E11.122 |
| 2006/0161752 A1 * | 7/2006 | Burkey ................. G06F 3/0632 |
| | | 711/170 |
| 2006/0248047 A1 * | 11/2006 | Grier ....................... G06F 3/067 |
| 2007/0266203 A1 * | 11/2007 | Amano ............... G06F 11/1456 |
| | | 711/111 |
| 2010/0223442 A1 | 9/2010 | Yamashita et al. |
| 2013/0013953 A1 * | 1/2013 | Eck .................... G06F 11/0712 |
| | | 718/1 |
| 2016/0019317 A1 | 1/2016 | Pawar et al. |

* cited by examiner

METHOD AND SYSTEM FOR BACKING UP AND RESTORING DATA

RELATED APPLICATIONS

This application is a divisional of U.S. application Ser. No. 15/996,568, filed Jun. 4, 2018, which claims priority from Chinese Patent Application Number CN201710409481.5, filed on Jun. 2, 2017 at the State Intellectual Property Office, China, titled "METHOD AND SYSTEM FOR BACKING UP AND RESTORING DATA." The contents of both prior applications are incorporated herein by reference in their entirety.

FIELD

The present disclosure relates to data management and protection. More specifically, the present disclosure relates to method for backing up and restoring data of the server storage area network node and system thereof, as well as backup device and its agent method.

BACKGROUND

Storage Area Network (SAN) is a dedicated high-speed storage network independent of business network with block-level data as the basic access object. A typical composition of SAN includes server, storage device, host bus adaptor for connecting each storage device, switch and the like. Along with the increasingly extensive application of the server SAN, backup and restoration of data within the server SAN node is getting more and more important. In particular, how to better solve timely periodical backup of the server SAN node, long-term archiving, disaster recovery, replication management, compression/deduplication among other issues are vital for the server SAN, especially the server SAN in the enterprise environment.

The traditional methods for data protection of the server SAN all have disadvantages. For example, the server SAN native data protection cannot provide rich protection strategies for the server SAN data protection; and the data protection solution based on the combination of the backup server and the backup devices has a complicated system configuration and higher costs, and the involved backup server may cause performance bottleneck of the system.

SUMMARY

The present disclosure provides a method for backing up and restoring data, which can simplify system configuration, overcome performance bottleneck of the system and increase data protection efficiency.

According to one aspect of the present disclosure, there is provided a method for backing up and restoring data. The method comprises: determining, at a server storage area network (SAN) node, an LUN required for protection in a server SAN node based on communication between a backup agent and a logic unit number (LUN) agent in the server SAN node; determining a target backup device based on communication between the backup agent and respective target agent of a plurality of backup devices, the plurality of backup devices being connected with the server SAN node; and in response to trigger of the backup or restoration, transmitting a virtual disk control command to the target backup device, such that data in the LUN required for protection is backed up to the target backup device or restored from the target backup device via an activated virtual disk interface of the target backup device.

According to a second aspect of the method, there is also provided a system for a server storage area network (SAN) node, the system comprising: a memory configured to store one or more programs; a processing unit coupled to the memory and configured to execute the one or more programs, causing the management system to execute a plurality of actions including: determining, at a server storage area network (SAN) node, an LUN required for protection in a server SAN node based on communication between a backup agent and a logic unit number (LUN) agent of the server SAN node; determining a target backup device based on communication between the backup agent and respective target agent of a plurality of backup devices, the plurality of backup devices being connected with the server SAN node; and in response to trigger of the backup or restoration, transmitting a virtual disk control command to the target backup device, such that data in the LUN required for protection is backed up to the target backup device or restored from the target backup device via an activated virtual disk interface of the target backup device.

According to a third aspect of the present disclosure, there is provided an agent method for a backup device, the method comprising: acquiring usage condition and health condition of the backup device; reporting the acquired usage condition and health condition to a backup agent in a server SAN node connected with the backup device; controlling a virtual disk interface of the backup device in response to detecting a virtual disk control command from the server SAN node, such that data within an LUN required for protection of a server SAN node is backed up to the backup device or restored from the backup device.

According to a fourth aspect of the present disclosure, there is provided a backup device, comprising: a memory configured to store one or more programs; a processing unit coupled to the memory and configured to execute the one or more programs, causing the management system to execute a plurality of actions including: acquiring usage condition and health condition of the backup device; reporting the acquired usage condition and health condition to a backup agent in a server SAN node connected with the backup device; in response to detecting a virtual disk control command from the server SAN node, controlling a virtual disk interface of the backup device, such that data within an LUN required for protection of a server SAN node is backed up to the backup device or restored from the backup device.

According to a fifth aspect, there is provided a computer program product tangibly stored in a non-transient computer-readable medium and including machine-executable instructions, the machine-executable instructions, when executed, causing a machine to execute the method of the first aspect or the third aspect.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

In each drawing, same or corresponding signs indicate same or corresponding parts.

DETAILED DESCRIPTION OF EMBODIMENTS

Preferred embodiments of the present disclosure will be described in details with reference to the drawings. Although the drawings show the preferred embodiments of the present disclosure, it should be appreciated that the present disclosure can be implemented by various manners and should not be limited to the embodiments illustrated herein. Instead, these embodiments are provided to make the present disclosure more thorough and complete, so as to fully convey the scope of the present disclosure to those skilled in the art.

As used herein, the term "include" and its variants are to be read as open-ended terms that mean "include, but is not limited to." The term "or" is to be read as "and/or" unless the context clearly indicates otherwise. The term "based on" is to be read as "based at least in part on." The terms "an example embodiment" and "an embodiment" are to be read as "at least one example embodiment." The term "another embodiment" is to be read as "at least one further embodiment." The terms "first" and "second" can represent different or same objects. The following text may also include other explicit and implicit definitions.

As described above, a traditional method for backing up and restoring data of a server SAN node mainly includes two kinds. One is a server SAN native data protection solution, i.e., the server SAN node operates the backup jobs with its own idle computing and network resources; the other is a data protection solution based on the backup server in combination with the backup devices, i.e., operating the backup software via the backup server to further back up data of the server SAN node to a backup device. Both the solution dependent on the server SAN native data protection, and the data protection solution based on the combination of the backup server and the backup devices have defects. For example, the former cannot provide rich protection strategies for the server SAN data protection; and the latter has a complicated system configuration and high costs, and the involved backup server may cause performance bottleneck of the system. That is, the traditional methods for backing up and restoring data of the server SAN node have technical defects.

Figure 1:
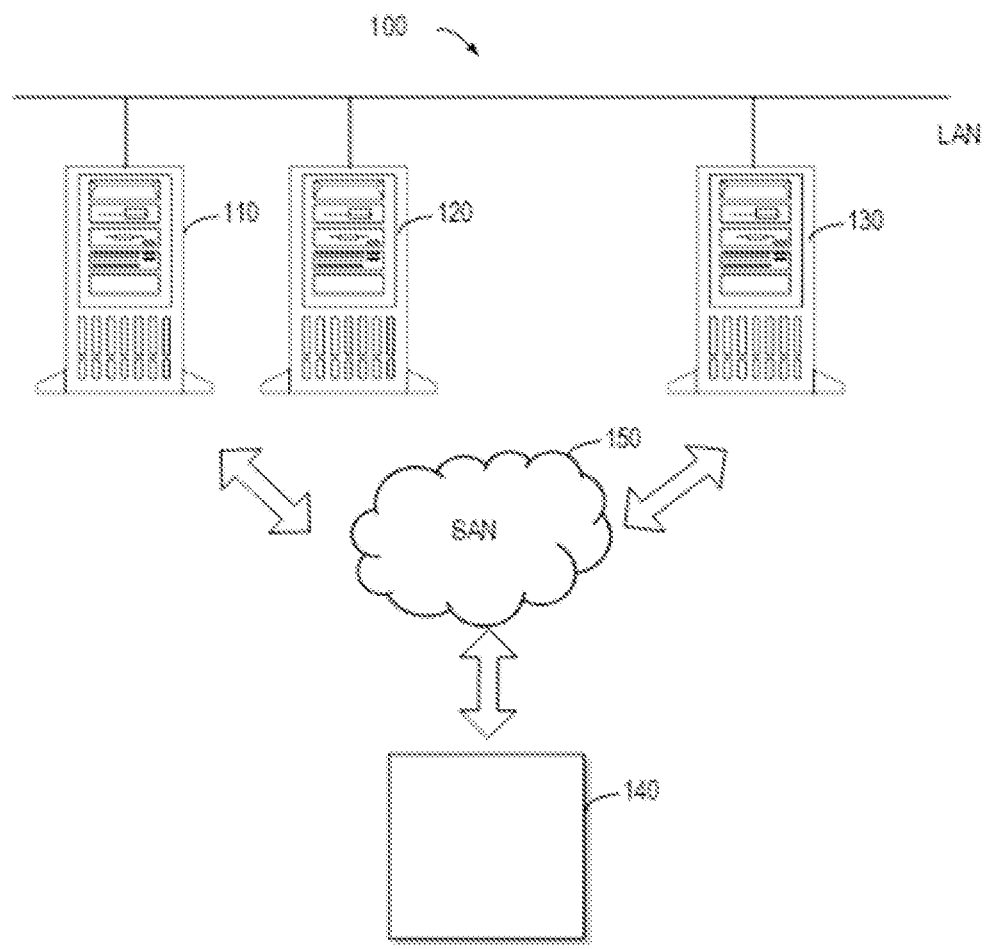
FIG. 1 illustrates an architecture diagram of a traditional system 100 for backing up and storing data of a server SAN node.

For example, FIG. 1 illustrates an architecture diagram of a traditional system 100 for backing up and storing data of a server SAN node based on the combination of backup server and backup devices. As shown in FIG. 1, the system 100 includes a plurality of server SAN nodes indicated by 110 and 120 for example. The application programs only need to be directly operated on the server SAN rather than on a separate application program server, wherein the server SAN node can provide computing resources for the application programs. Additionally, the system also contains a backup server 130 and a backup device 140, which are connected via an SAN network 150, where the backup server 130 moves the data, through the backup software (such as Networker or Avamar) operated thereon, from the server SAN node to the backup device. The backup server 130 is used for storing catalog, instead of user data. The backup device 140 is used for copying user data from the server SAN and usually has a large capacity for storing user data. Because the server SAN may include a plurality of nodes, the above 110 and 120 are only exemplary. The number of nodes is increasing in the recent years, for example, Scale IO supports up to 1024 nodes.

In one aspect, to backup and restore data of so many nodes, it is required to equip with a larger storage device and an backup server with higher configuration, which greatly increases the costs of the system configuration. However, when the server SAN nodes itself possess free computing/network resources for data backup, users normally expect a solution with lower costs and simple configuration. In another aspect, because the backup server 130 is required to operate the backup software to migrate data between server SAN nodes 110 and 120 and the backup device 140, the backup server 130 needs to interface with the backup device 140 and the server SAN nodes 110 and 120, which not only increases complexity of the system configuration, and also makes the performance of the entire system easily implicated by the performance of the backup server 130, i.e., the backup server 130 becomes a bottleneck of the performance of the entire system 100.

To at least partially solve the above problems and one or more of other potential problems, example embodiments of the present disclosure provide a solution for backing up and restoring data of a server SAN node. The solution configures a target agent on each of the plurality of backup devices by setting up a backup agent and a logic unit number (LUN) agent in the server SAN node; and further determines the LUN required for protection in the server SAN node and the target backup device for offering protection based on interactions among backup agent, LUN agent and target agent; and performs direct data backup or restoration between the LUN required for protection and the target backup device by using a virtual disk interface of the target backup device. Because the solution directly moves the data from the primary storage of the server SAN node to the target backup device via the virtual disk interface of the target backup device, it can improve end-to-end performance. without using an additionally configured backup server, the solution can further simplifies connection and configuration of the data center, which can significantly save the configuration costs.

Figure 2:
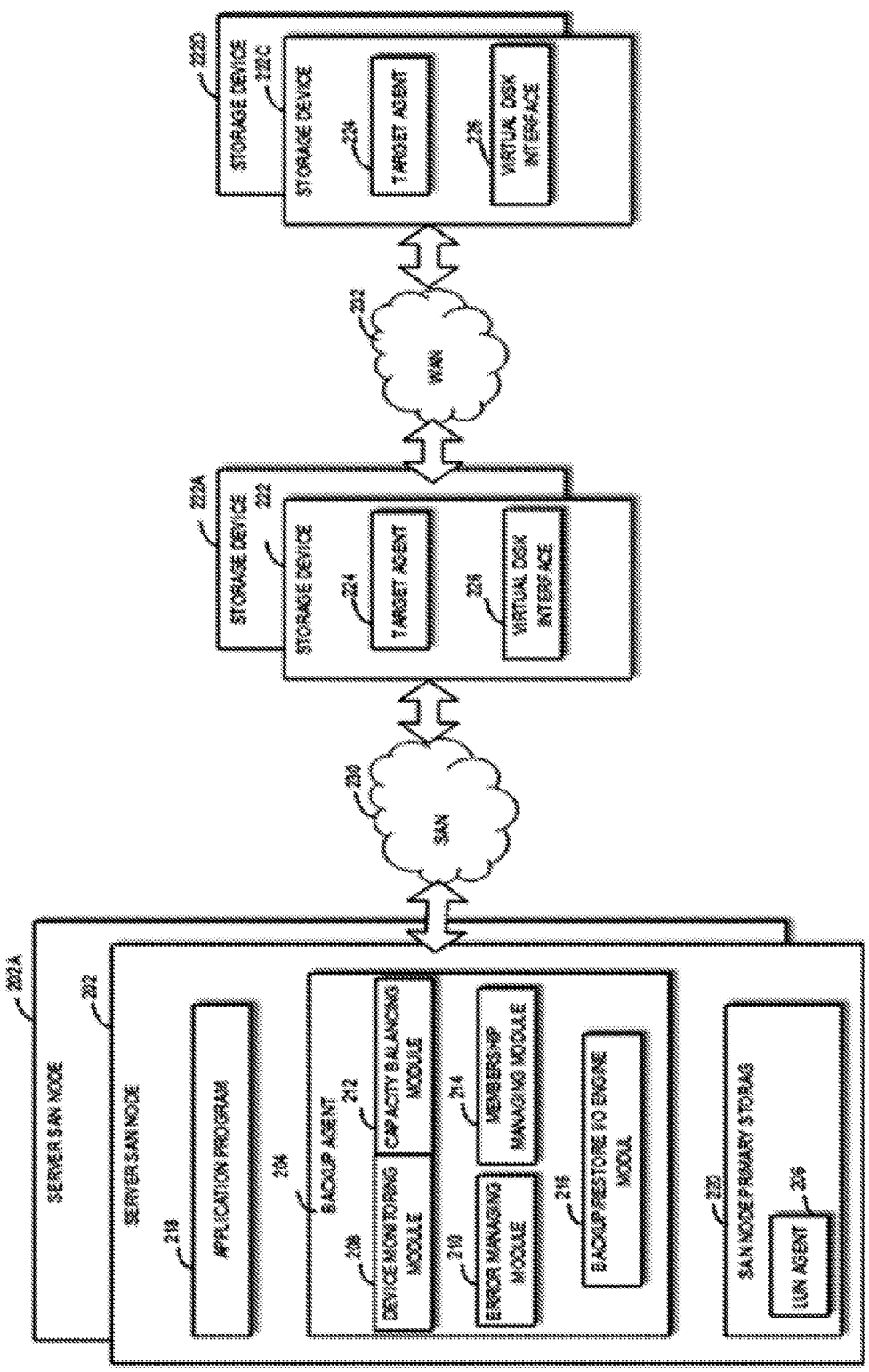
FIG. 2 illustrates an architecture diagram of a system 200 for backing up and storing data of a server SAN node according to embodiments of the present disclosure.

FIG. 2 illustrates an architecture diagram of a system 200 for backing up and storing data of a server SAN node according to embodiments of the present disclosure. It should be understood that the structure and the function of the system 200 shown by FIG. 2 are only for the purpose of examples, without suggesting any restrictions over the scope of the present disclosure. Embodiments of the present disclosure can be embodied in different structures and/or functions.

As shown in FIG. 2, the system 200 includes, for example, a plurality of server SAN nodes and a plurality of backup devices, the plurality of server SAN nodes being connected with the plurality of storage devices via the network SAN 230. In some embodiments, the network SAN 230 is FC-SAN or IP-SAN for example, wherein the FC-SAN forwards SCSI protocol via the fiber channel protocol, and the IP-SAN forwards SCSI protocol via the TCP protocol. The system 200 schematically contains server SAN nodes 202 and 202A, as well as backup devices 222, 222A, 222B and 222C. In some embodiments, the backup devices 222 and 222A, for example, are backup devices for establishing a local data center, and the backup devices 222B and 222C, for example, are remote backup devices that establish communication via the wide area network WAN 232, such as a cloud server for cloud storage.

In some embodiments, the server SAN can be, for example, VSAN, ScaleIO or Ceph. The application data can be periodically backed up daily/weekly/by-weekly/monthly, so users can restore the complete copies of application data along the time line. According to FIG. 2, backup agent 204, logic unit number (LUN) agent 206 and application program 218 are configured in each server SAN node 202 and 202A, where the backup agent 204 directly operates on the server SAN node for controlling the server SAN node to execute data backup and restoration operations, such as copying data required for protection into the target backup device. The LUN agent 206 is configured in the primary storage 220 of the server SAN node for reporting usage condition of LUN. In some embodiments, the primary storage 220 of the server SAN node is for example pooled to a storage pool, which includes a plurality of LUNs. The LUN agent 206 is configured on each LUN for example for reporting usage condition of the LUN, such as reporting occupating coefficient and/or access frequency of each LUN to the backup agent 204, such that the backup agent 204 determines the LUN required for protection. Due to the setting of LUN agent, it facilitates determining the LUN in real need of protection in the server SAN, which avoids wasting resources to protect idle LUN or mirroring LUN in the server SAN, thereby enhancing backup efficiency and saving backup resources.

In terms of the backup device, according to FIG. 2, the backup device 222 is configured with a target agent 224 and a virtual disk interface (Vdisk interface) 226, wherein the target agent 224 collects backup condition of the backup device 222 and reports it to the backup agent 204, such that the backup agent selects a suitable target backup device from a plurality of backup devices. When the target backup device receives a virtual disk control command from the server SAN node, a virtual disk 226 interface of the backup device is controlled, such that data in the LUN required for protection in the server SAN node is backed up to the target backup device or restored from the target backup device. In some embodiments, the backup device 222, such as Data Domain system, builds a virtual storage pool based on the Data Domain data protection device DDR. The virtual storage pool consists of a plurality of virtual disks, and the DDR contains a storage management system module, e.g., Data Domain Storage Management Sub-system (DD SMS), where the DD SMS in DDR. After receiving the virtual disk control command transmitted by the server SAN node, activates read-write for the virtual disk interface 226, such that the server SAN node 202 can access the virtual disk interface 226 and directly back up data required for protection to the target storage device via the virtual disk interface 226, or directly restore from the target storage device.

Since the backup agent 204 directly operates on the server SAN node and utilizes the virtual disk interface of the target backup device to move the data directly from the server SAN node to the backup device, which not only avoids additional configuration of a particular backup server, but also avoids influence on the application programs during backup and restoration, and improves end-to-end performance. The subsequent contents will further schematically describe implementations of the system for backing up and restoring data with reference to FIG. 8.

Figure 3:
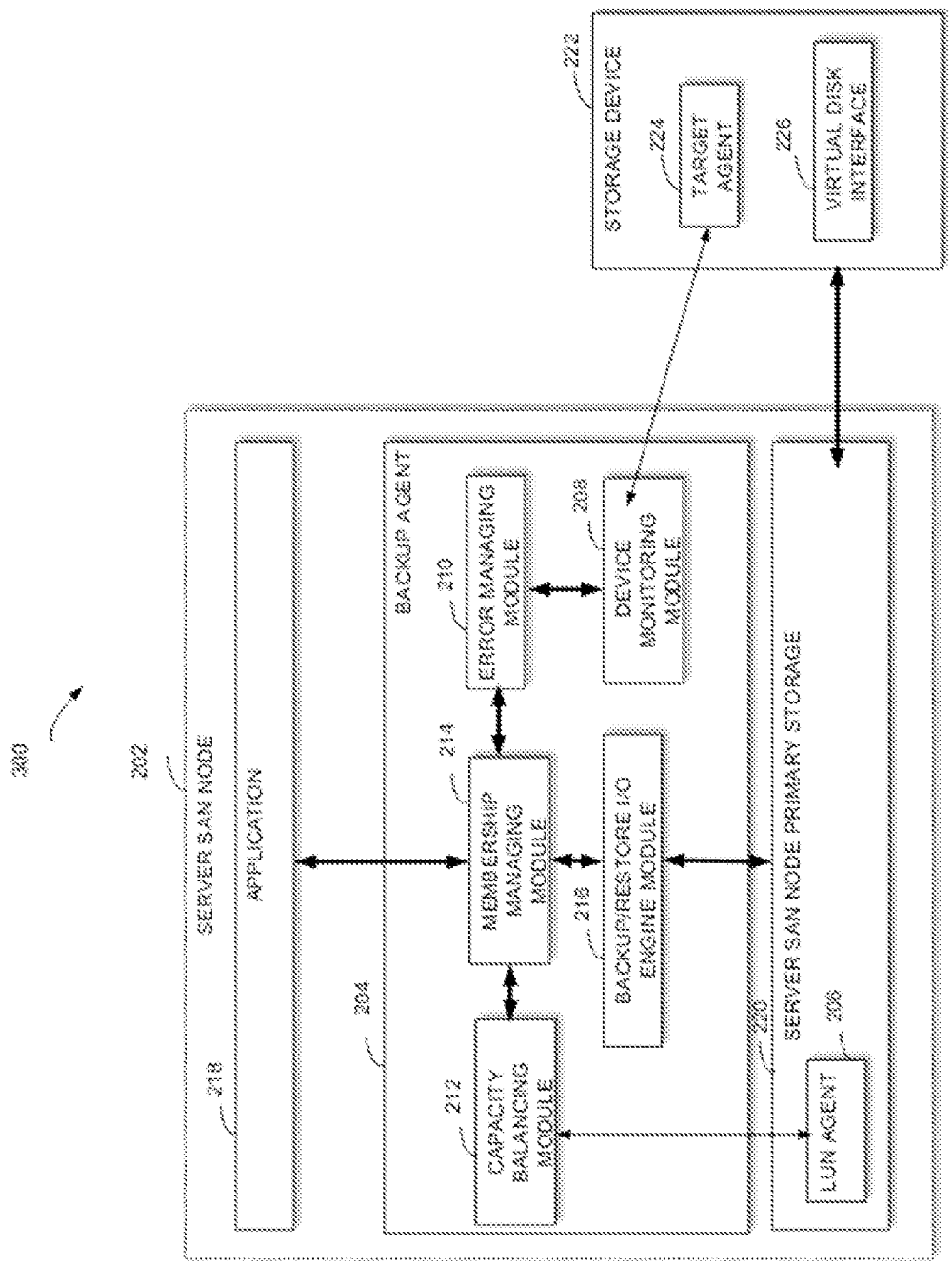
FIG. 3 illustrates a schematic diagram of signal interaction of a system 300 for backing up and restoring data of the server SAN node according to embodiments of the present disclosure.

Regarding the backup agent of the server SAN node, in some embodiments, the backup agent 204 further consists of a device monitoring module 208, an error managing module 210, a capacity balancing module 212, a membership managing module 214 and a backup/restore I/O engine module 216. With reference to FIG. 3, it will schematically describe components and functions of the backup agent 204, and signal relationships between the backup agent 204, Logic Unit Number (LUN) agent 206, the application program 208, and the backup agent 224 in the backup device. FIG. 3 illustrates a schematic diagram of signal interaction of a system 300 for backing up and restoring data of the server SAN node according to embodiments of the present disclosure.

The device monitoring module 208 communicates with the target agent 224, which is used for monitoring condition of the backup device. The condition of the backup device can be, for example, usage condition and health condition of the backup resources of the backup device 222. In some implementations, the health condition of the backup device is checked by "heartbeat" signal response at a given time interval between the device monitoring module 208 and the target agent 224. When the "heartbeat" signal response stops, the device monitoring module 208 determines that the backup device 222 in which the target agent 224 is located goes wrong.

The error managing module 210 communicates with the device monitoring module 208 and the membership managing module 214, which is used for determining the target backup device, reporting the determined result to the membership managing module 214 and executing failover strategies. In some embodiments, the error managing module 210 monitors failure events reported by the device managing module 208, and determines the target backup device based on at least one of usage condition of the backup device, health condition of the backup device, and the size of data required for protection (such as data size within the LUN required for protection). For example, if a certain backup device is found to be wrong, other backup device will be selected as the target backup device of the server SAN node for the coming data backup.

The capacity balancing module 212 communicates with the LUN agent 206 and the membership managing module 214, which is used for acquiring usage condition of the LUN in the primary storage 220 of the server SAN node and reporting it to the membership managing module 214. In some embodiments, the capacity balancing module 212 acquires, via the communication with the LUN agent 224, occupating coefficient and access frequency information of each LUN in the primary storage 220 of the server SAN node, and reports the information to the membership managing module 214. Besides, the capacity balancing module 212 is also used for capacity balance among the backup devices.

The membership managing module 214 communicates with the error managing module 210, the capacity balancing module 212, the backup/restore I/O engine module 216 and application programs on the server SAN node, which is used for managing the backup devices. In some embodiments, the membership managing module 214 is used for determining the binding relationship between the LUN required for protection and the virtual disk of the backup device, and maintaining state of the backup device based on the results reported by the error managing module 210.

The backup/restore I/O engine module 216 communicates with the membership managing module 214 and the primary storage of the server SAN, which is used for quiescing I/O of the application programs in response to the backup or restoration being triggered, and directing the I/O to the LUN required for protection. For example, in response to the backup or restoration being triggered, the application programs need to suspend I/O so as to make the application programs consistent; then the backup/restore I/O engine module 216 directs the I/O to the LUN required for protection and helps make snapshots. By means of the above functions of the backup/restore I/O engine module 216, it can execute of the data backup/restoration without affecting performance of the application programs at the same time. Because the backup agent of the server SAN node conducts communication and signal interaction with the target agent via the above modules, it can better manage and support a plurality of discrete backup devices, such as realizing determination of the target backup device, capacity balancing and failover etc. Therefore, the system has better scalability and larger storage capacity, which can support data backup and restoration of a large number of server SAN nodes.

Figure 4:
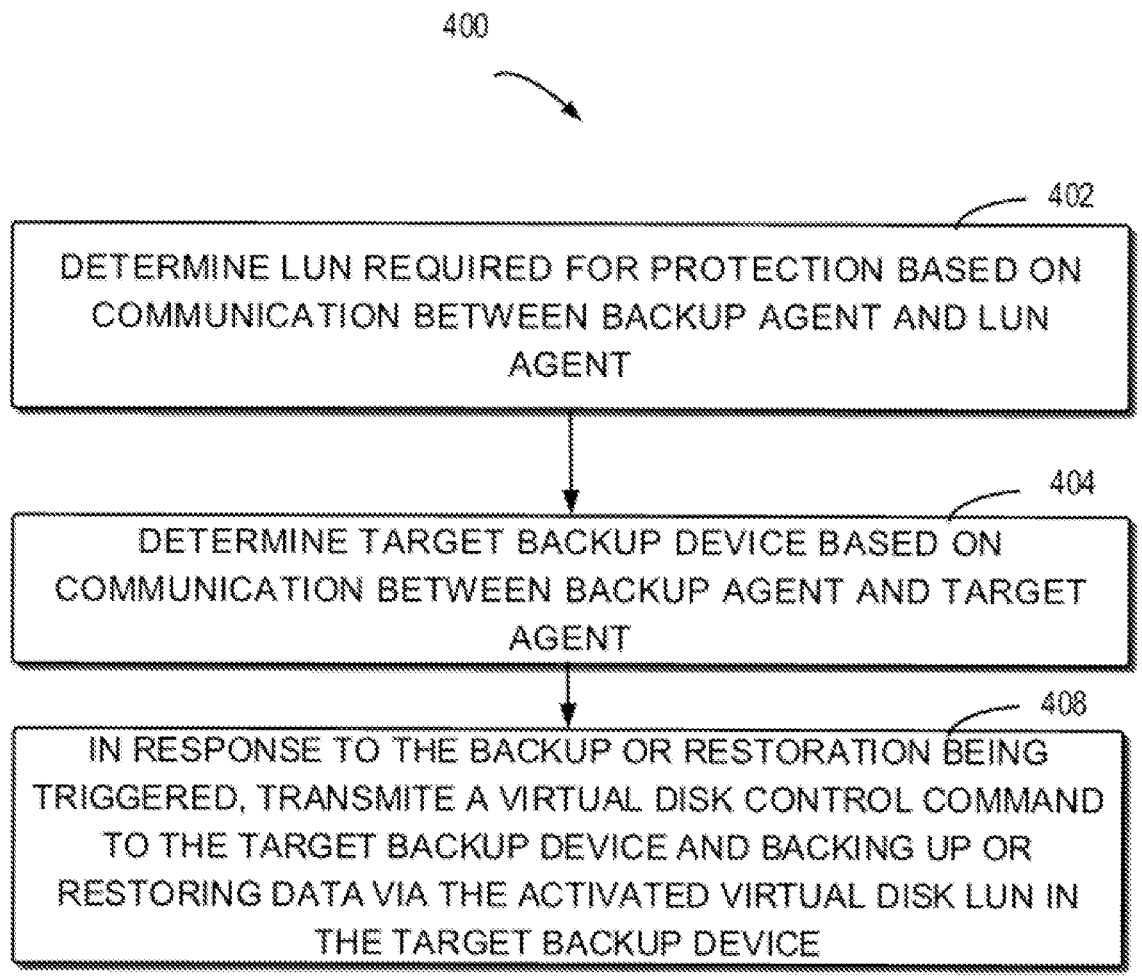
FIG. 4 illustrates a flowchart of a method 400 for backing up and restoring data according to embodiments of the present disclosure.

FIG. 4 illustrates a flowchart of a method 400 for backing up and restoring data according to embodiments of the present disclosure. The method for backing up and restoring data of the server SAN node in FIG. 4 will be specifically described with reference to the system 200 in FIG. 2. For the sake of discussion, the method 400 is described in general by taking the server SAN node 202 and the backup device 222 shown in FIG. 2 as examples. In FIG. 4, each action, for example, is executed by the server SAN node 202. The method 400 can also include additional actions not shown and/or shown actions that can be omitted and the scope of the present disclosure is not restricted in this regard.

At block 402, the LUN required for protection within the server SAN node is determined, at the server SAN node, based on the communication between the backup agent 204 of the server SAN node 202 and the LUN agent 206. In some embodiments, the storage resources in the server SAN node 202 can be divided into working LUN and idle LUN for example, and obviously there is no need to back up and restore the idle LUN. The present disclosure acquires, via the LUN agent 206, the usage condition of the LUN in the primary storage 220 of the server SAN node, and determines the LUN required for protection based on the usage condition of the LUN. Therefore, it can back up and restore the data within the LUN required for protection only, which can further significantly improve backup efficiency and save backup resources of the target backup device. For example, in some embodiments, the capacity balancing module 212 of the backup agent 204 acquires, via the communication with the LUN agent 206, occupating coefficient and access frequency information of each LUN in the primary storage 220 of the server SAN node, and reports the information to the membership managing module 214. The membership managing module 214 determines the LUN required for protection and the frequency for backing up or restoring data based on the information. For example, it can back up the important, such as frequently accessed, working data at a higher frequency, replicate the non-working data at a relatively lower frequency and not replicate the idle LUN. Accordingly, it can improve backup efficiency and save backup resources of the target backup device.

At block 404, the target backup device is determined based on the communication between the backup agent 204 and respective target agent 224 of the plurality of backup devices 222. In some embodiments, the backup agent 204 determines the target backup device based on at least one of usage condition of each backup device, health condition of the backup device reported by respective target agent 224 and the data size within the LUN required for protection determined at block 402.

At block 406, in response to the trigger of backup or restoration, a virtual disk control command is transmitted to the target backup device, such that the data within the LUN required for protection is backed up to the target backup device or restored from the target backup device via the activated virtual disk interface 226 of the target backup device. Because the data is directly moved from the server SAN node to the backup device via the virtual disk interface of the target backup device, there is no need for additionally configuring a backup server, which saves configuration costs and improve end-to-end performance. In some embodiments, the virtual disk interface, for example, is the SCSI interface of the target backup device, i.e., Data Domain data protection device DDR. At block 408, in response to backup or restoration being triggered, such as after creating snapshots on the primary storage 220 of the server SAN, the server SAN node 202 transmits the virtual disk control command to the determined target backup device, e.g., the Data Domain Storage Management Sub-system (DD SMS) on the target backup device 222, i.e., Data Domain data protection device DDR. The data domain storage management module activates, in response to the disk control command, the read-write for the virtual disk interface 226 of the backup device 222, such that data within the LUN required for protection is backed up to the target backup device or restored from the target backup device via the virtual disk interface 226 of the target backup device. In some embodiments, in response to the backup being triggered for the first-time, back up all data of the LUN required for protection; then, change data within the LUN required for protection is tracked. All changes of data occurred within the LUN required for protection are tracked with a Change Block Tracking (CBT). For example, the changed data can be stored in the change block with a tiered storage service. In response to the backup or restoration being triggered once again, an incremental backup or restoration is made for the data of the LUN required for protection, i.e., performing incremental backup or restoration for the data of the change blocks. It continues to track all changes of data occurred within the LUN required for protection with the Change Block Tracking (CBT) after the incremental backup or restoration.

The primary storage 220 of the server SAN node 202 is built based on the tiered storage technology. The virtual disk in the backup device DDR is visible for the server SAN node 202 at the side of the server SAN node 202, but all of its data is actually stored on the backup device 222, e.g., on the Data Domain system of the backup device. At the backup agent, the virtual disk is determined for the LUN required for protection based on a predetermined binding relationship between the LUN in the server SAN node and the virtual disk of the target backup device.

Figure 5:
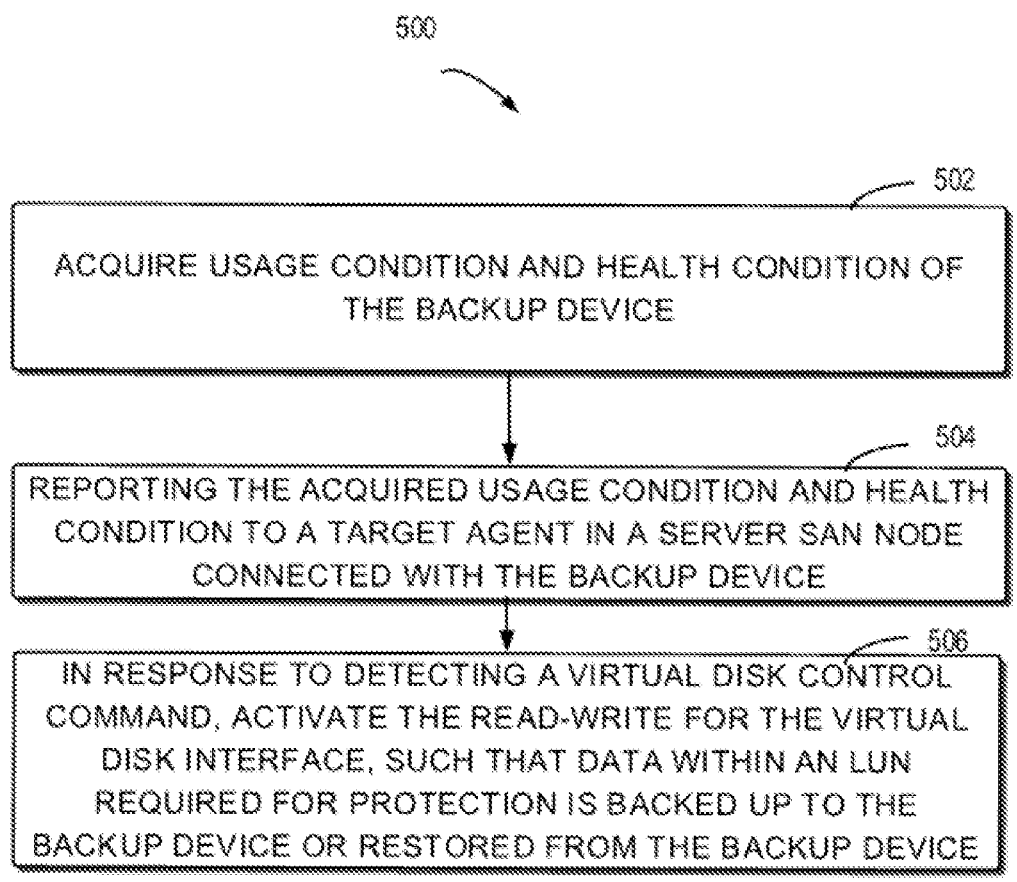
FIG. 5 illustrates a flowchart of an agent method for a backup device according to embodiments of the present disclosure.

An agent method 500 for a target backup device which is cooperated with the method 400 for backing up and restoring data of the server SAN node will be specifically described with reference to FIG. 5. FIG. 5 illustrates a flowchart of an agent method for a backup device according to embodiments of the present disclosure. For the sake of discussion, the method 500 is generally described by taking the server SAN node 202 and the backup device 222 shown in FIG. 2 as examples. In FIG. 5, each action is executed for example by the backup device 222. The method 500 also can include additional actions not shown and/or shown actions that can be omitted, and the scope of the present disclosure is not restricted in this regard.

At block 502, usage condition and health condition of the backup device 222 are acquired. In some implementations, the usage condition and health condition of storage resources of each backup device are acquired through the target agent 224 of each backup device 222 and used for determining the target backup device. In addition, the usage condition of the storage resources of the backup device can also be used for capacity balancing of the backup device.

At block 504, the acquired usage condition and health condition of the backup device 222 are reported to the target agent 204 which is connected with the backup device in the server SAN node 202. In some implementations, the target agent 204 reports the acquired usage condition and health condition of the storage resources of the backup device to the device monitoring module 208, to facilitate the monitoring module 208 to further report the acquired backup device state to the membership managing module 214, thereby managing and maintaining each backup device and reporting to the error managing module 210 for determining the target backup device.

At block 506, in response to detecting the virtual disk control command, the read-write for the virtual disk interface are activated, such that data within the LUN required for protection of the server SAN node is backed up to the backup device or restored from the backup device. In some embodiments, after receiving the virtual disk control command transmitted by the server SAN node, Data Domain Storage Management Sub-system DD SMS in the DDR of the backup device activates read-write for the virtual disk interface 226 (e.g., SCSI interface), such that the server SAN node can access the virtual disk interface 226, thereby backing up (writing) the data within the LUN required for protection to the backup device or restoring (reading) the data from the backup device. For example, changes of the data required for protection, relative to last data backup, are recorded by using the storage block 904.

Figure 6:
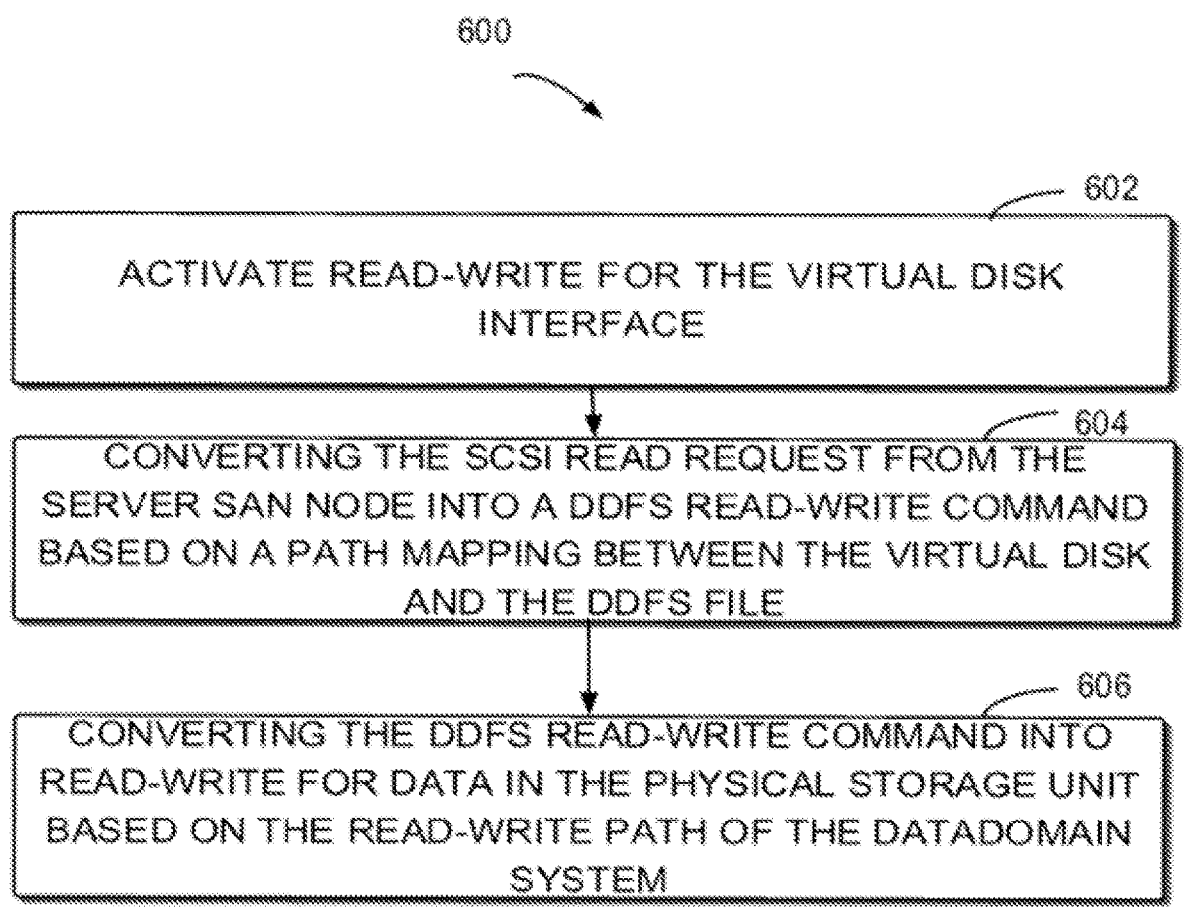
FIG. 6 illustrates a flowchart of a read-write method 600 for a virtual disk interface of the backup device according to embodiments of the present disclosure.

The read-write process via the virtual disk interface SCSI can be performed in the way shown by FIG. 6 in some embodiments. FIG. 6 illustrates a flowchart of a read-write method 600 for a virtual disk interface of the backup device according to embodiments of the present disclosure. As shown in FIG. 6, at block 602, read-write for the virtual disk interface is activated. At block 604, the SCSI read-write request from the primary storage of the server SAN node is converted into the DDFS read-write command based on the path mapping between the virtual disk and files in the Data Domain File System (DDFS). At block 606, the DDFS read-write command is converted into read-write for data in the physical storage units of the backup device based on the read-write path of the Data Domain system.

Figure 7:
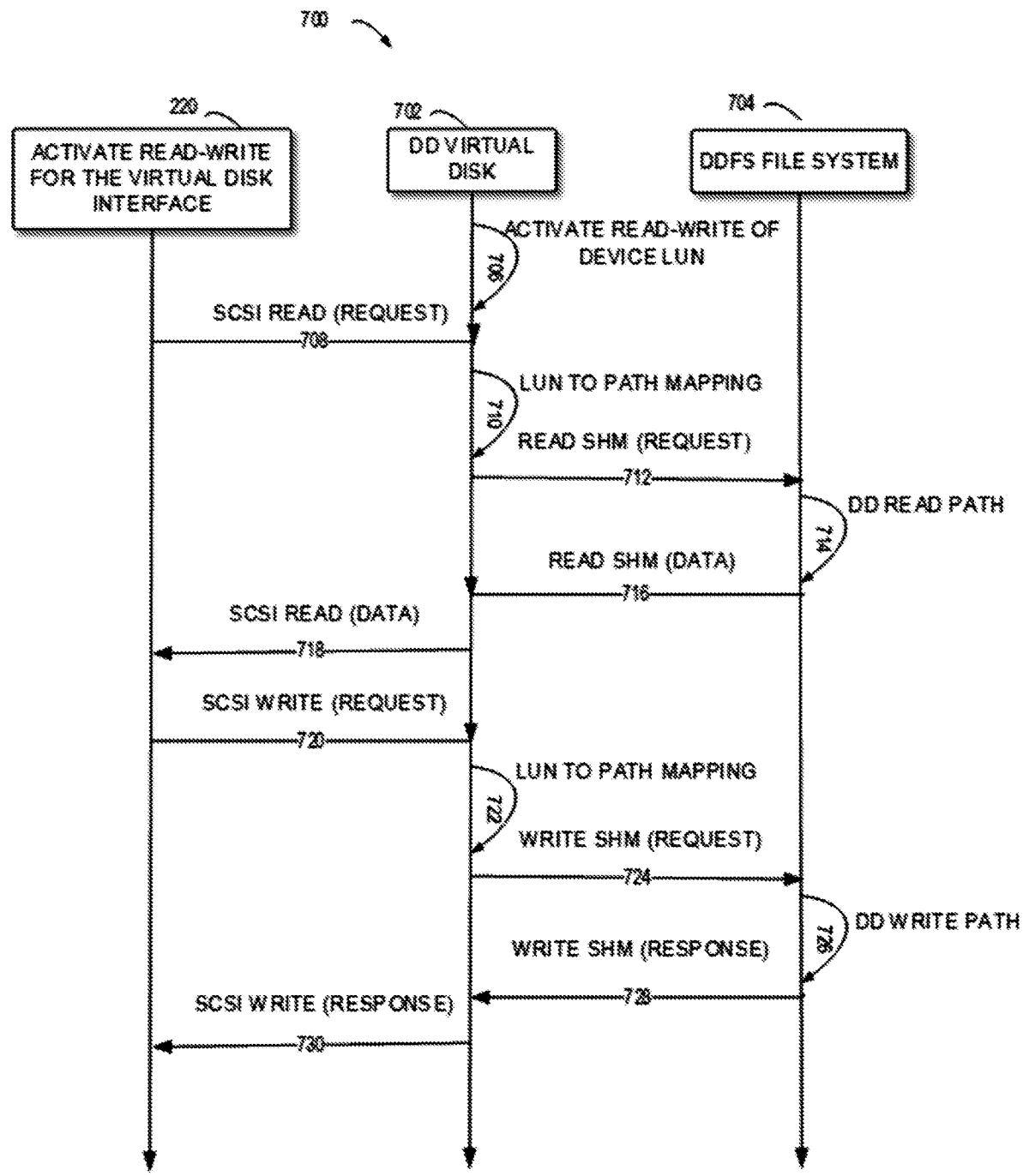
FIG. 7 illustrates an I/O flow diagram in the method 700 for a virtual disk interface of the backup device according to embodiments of the present disclosure.

In some embodiments, the I/O flow of the method for backing up and restoring data via the virtual disk interface can be performed in the way shown by FIG. 7. FIG. 7 illustrates an I/O flow diagram in the method 700 for backing up and restoring data via the virtual disk interface according to embodiments of the present disclosure. The I/O flow situation when the primary storage of the server SAN node reads and writes data via the virtual disk interface of the Data Domain system of the target backup device will be further described with reference to FIG. 7. As shown in FIG. 7, during the process of restoring data at the server SAN node, after the read-write for the virtual disk interface of the backup device being activated 706, the primary storage 220 of the server SAN node transmits an SCSI read request 708 to the virtual disk interface 702 of the Data Domain system; the virtual disk interface 702 of the Data Domain system converts, via the LUN to path mapping 710, the SCSI read request into a read shm request 712 for the files in the DDFS file system; the DDFS file system, after receiving the read shm request, reads data stored in the physical storage units through the DD path 714 of the Data Domain system and then transmits the read shm (data) 716 via the DDFS file system 704 to the virtual disk interface 702 of the Data Domain system; afterwards, the SCSI read (data) 720 is transmitted to the primary storage 220 of the server SAN node via the virtual disk interface 702, which finally realizes migrating the read data to the primary storage 220 of the server SAN node. The above process of reading data from the server SAN node to the backup device essentially reflects the I/O flow of the process for restoring data of the server SAN node. During the data backup of the server SAN node, the primary storage 220 of the server SAN node transmits the SCSI write request 720 to the virtual disk interface 702 of the Data Domain system, and the virtual disk interface 702 converts, via the LUN to path mapping 722, the SCSI write request into a write shm request for the files in the DDFS file system; the DDFS file system, after receiving the DDFS write shm request 724, is associated with the physical storage units through the DD write path 726 of the Data Domain system, then transmits the write shm response 728 to the virtual disk interface 702 via the DDFS file system 704, and accordingly transmits the SCSI write response 730 to the primary storage 220 of the server SAN node via the virtual disk interface 702, thereby realizing migrating the data from the primary storage of the server SAN node to the backup device. The process of writing data from the above server SAN node to the backup device essentially reflects the I/O flow of the process for backing up data of the server SAN node.

Figure 8:
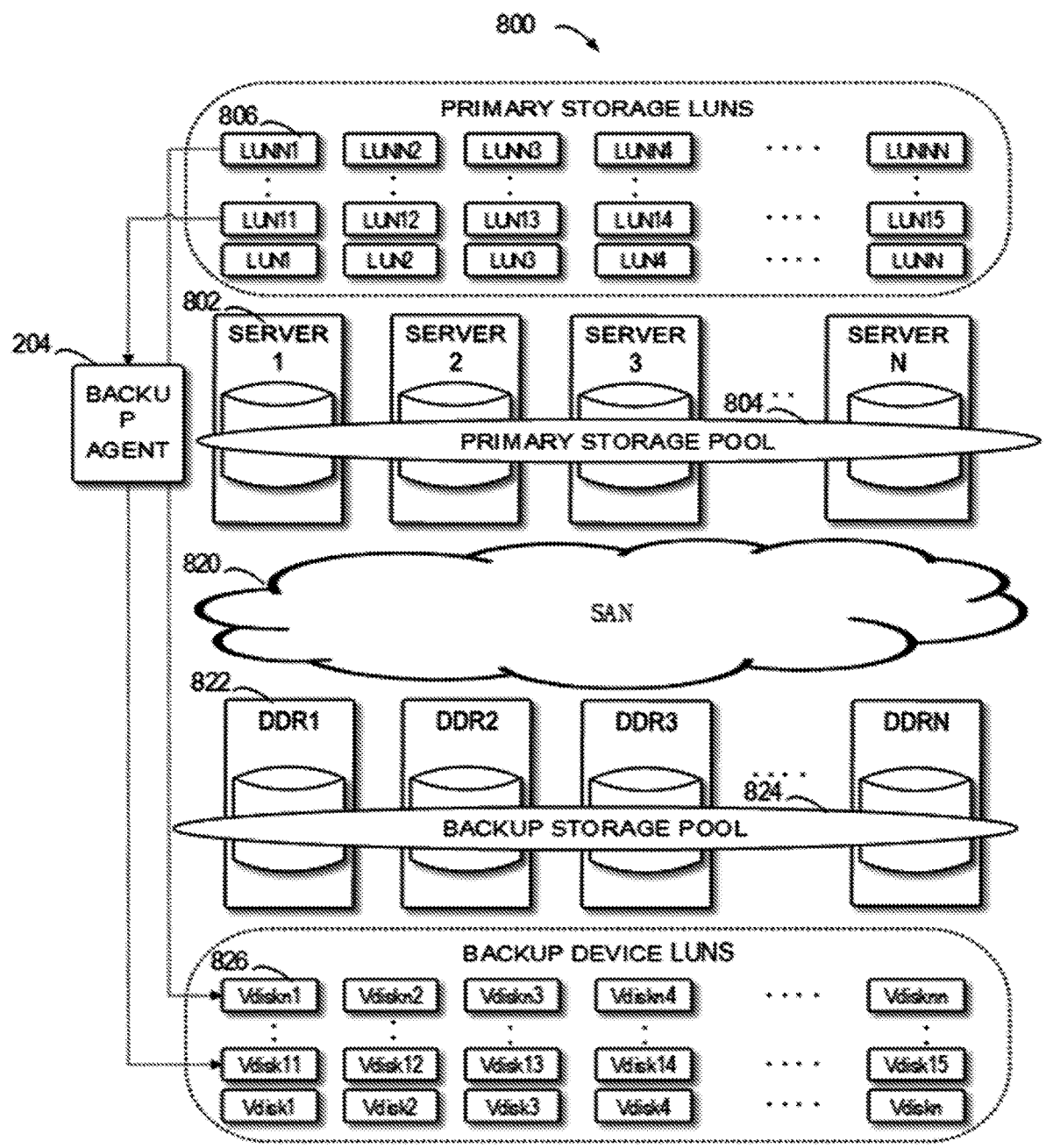
FIG. 8 illustrates an architecture diagram of a system 800 for backing up and restoring data of the server SAN node according to embodiments of the present disclosure.

Implementations of the system for backing up and restoring data will be further schematically described with reference to FIG. 8. FIG. 8 illustrates an architecture diagram of a system for backing up and restoring data of the server SAN node according to embodiments of the present disclosure. As shown in FIG. 8, a plurality of application servers like server 802, such as the server 1-N, is configured as server SAN nodes in the SAN. The storage device of the server 1-N, for example, can be pooled into the primary storage pool 804 for caching data that may possibly be read/written during the process for the data storage and store the data in a non-volatile manner, such that the storage resources of the server SAN node can be centralized and utilized. The primary storage pool 804, for example, consists of non-volatile storage space of various servers 1-N. In some embodiments, the storage space of the storage pool 800 can be divided into a plurality of storage blocks 806, such as LUN1-LUNNN, and data of the server SAN node is stored in these LUNs. A backup agent 204 is operating on each server SAN node.

A plurality of backup devices, which is connected with the server SAN node via the network 820 (e.g., SAN), is configured as storage nodes, wherein the backup device, for example, is Data Domain system. Deduplication technology of the Data Domain system is beneficial to acquiring higher storage efficiency and lower storage costs. A virtual backup storage pool 824 is built based on a plurality of Data Domain data protection devices DDR822, such as DDR1-N. The virtual storage pool 824 includes a plurality of virtual disks 826, e.g., VDisk1-VDiskNN, where each VDisk is bound to the LUN of the primary storage of the server SAN node via the backup agent 204 in the server SAN node. In some embodiments, the predetermined binding relationship, for example, is determined by the membership managing module in the backup agent 204 when system start-up. Each VDisk is visible at the side of the server SAN node. When the backup agent of the server SAN node selects, based on the communication with the target agent of the backup device, a suitable target backup device among the plurality of backup devices, and the read-write for the virtual disk interface (e.g., SCSI interface) of the target backup device is activated. Data within the LUN required for protection in the primary storage of the server SAN node can be directly backed up via the virtual disk interface to the virtual disk VDisk of the target backup device based on the predetermined binding relationship. Based on the path mapping between the virtual disk VDisk and the files in the DDFS file system and the read-write path of the Data Domain system, the target backup device further converts the read-write command for the virtual disk VDisk, from the server SAN node, into the read-write for the physical storage units of the backup device. It should be understood that FIG. 8 only shows an example of the system for backing up and restoring data of the server SAN node. For example, although the illustrated backup device is Data Domain system, it can also be backup device of other systems. In some examples, the server SAN node can be connected with the backup device in other ways, such as LAN or WAN.

Figure 9:
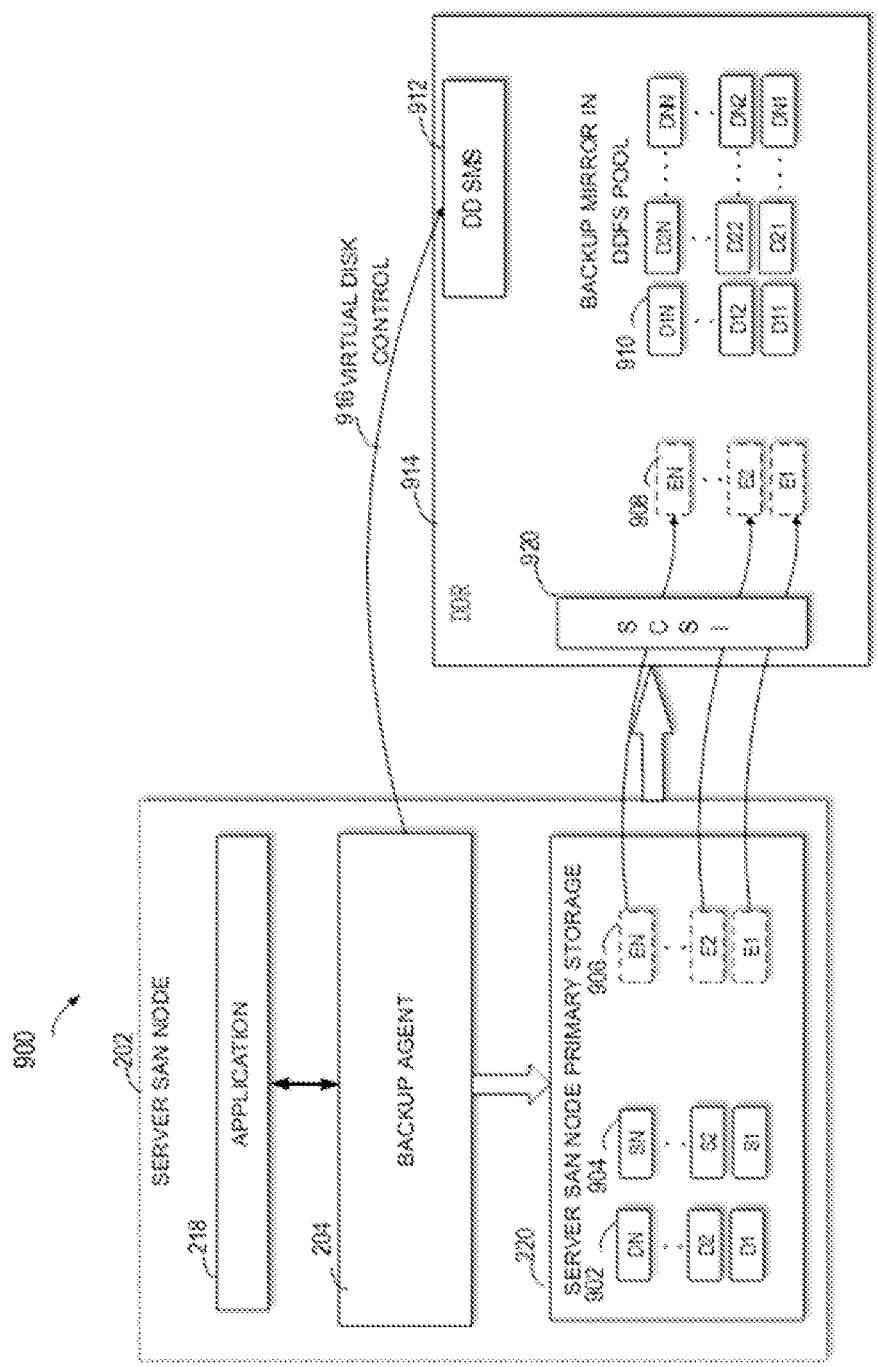
FIG. 9 illustrates a work flow of data backup of the server SAN node according to embodiments of the present disclosure.

The work flow of data backup of the server SAN node will be schematically described with reference to FIG. 9. FIG. 9 illustrates a work flow of data backup of the server SAN node according to embodiments of the present disclosure. The server SAN node can manage its own storage, access virtual disk of the backup device, and bind the LUN in the server SAN node with the virtual disk of the Data Domain system of the backup device. The binding function, for example, can be implemented by the tiered storage service of the server SAN. The binding relationship, for example, can be determined by the membership managing module in the backup agent when the system starts. During the backup of the server SAN node, the server SAN first creates snapshots and can also help store records of the change blocks through the tiered storage service. For example, the changes of the data required for protection, relative to the last backup, are recorded by using the storage block 904. The backup agent controls and drives the data flow without actually touching the data, so that the backup data flow will not influence the application programs during the whole backup process. Upon receiving a backup or restoration request, it first quiesces I/O of the application programs on the server SAN node, and then takes snapshots of the application programs to ensure consistency between the application programs and the snapshot copies. The advantage of capturing copies with snapshots is quickly restoring the application programs and reducing impacts.

Upon backing up the data of the server SAN node, it first quiesces the application programs and then captures copies on the server SAN with snapshots to ensure consistency with the application programs. The advantage of capturing copies with snapshots is quickly restoring the application programs and reducing impacts. The snapshot copies are stored in the snapshot storage block 902 of FIG. 9, such as storage block D1-DN. At the first-time data backup, it is required to transmit all data required for protection between the server SAN and the Data Domain system of the backup device. The server SAN tracks the changed data since the last backup and records the changed data on the change block 904 through the tiered storage. In case of subsequent data backup, it is only required to transmit data of the change block 904 to the Data Domain system of the target backup device. The backup agent 204 of the server SAN node 202 transmits the virtual disk control command to the storage management sub-system DD SMS 912 of the DDR 914 of the target backup device. In response to detecting the virtual disk control command, read-write of the virtual disk interface is activated. The primary storage 220 of the server SAN node transmits a read request to the virtual disk interface 920 (such as, SCSI interface), and the DDR of the target backup device converts, in accordance with the I/O flow during data write as shown in FIG. 7, the SCSI write request for the DD block device (e.g., virtual disk, i.e., LUN 908) of the DDR is converted into a DDFS write request for the files in the DDFS file system, thereby realizing migrating data from the primary storage of the server SAN node to the target backup device. In some embodiments, once all snapshot data has been transmitted and submitted to the Data Domain system of the target backup device, it can take snapshots of the LUN. The snapshots reflect the copies which is consistent with the application programs when the user data backup being triggered for the first.

Figure 10:
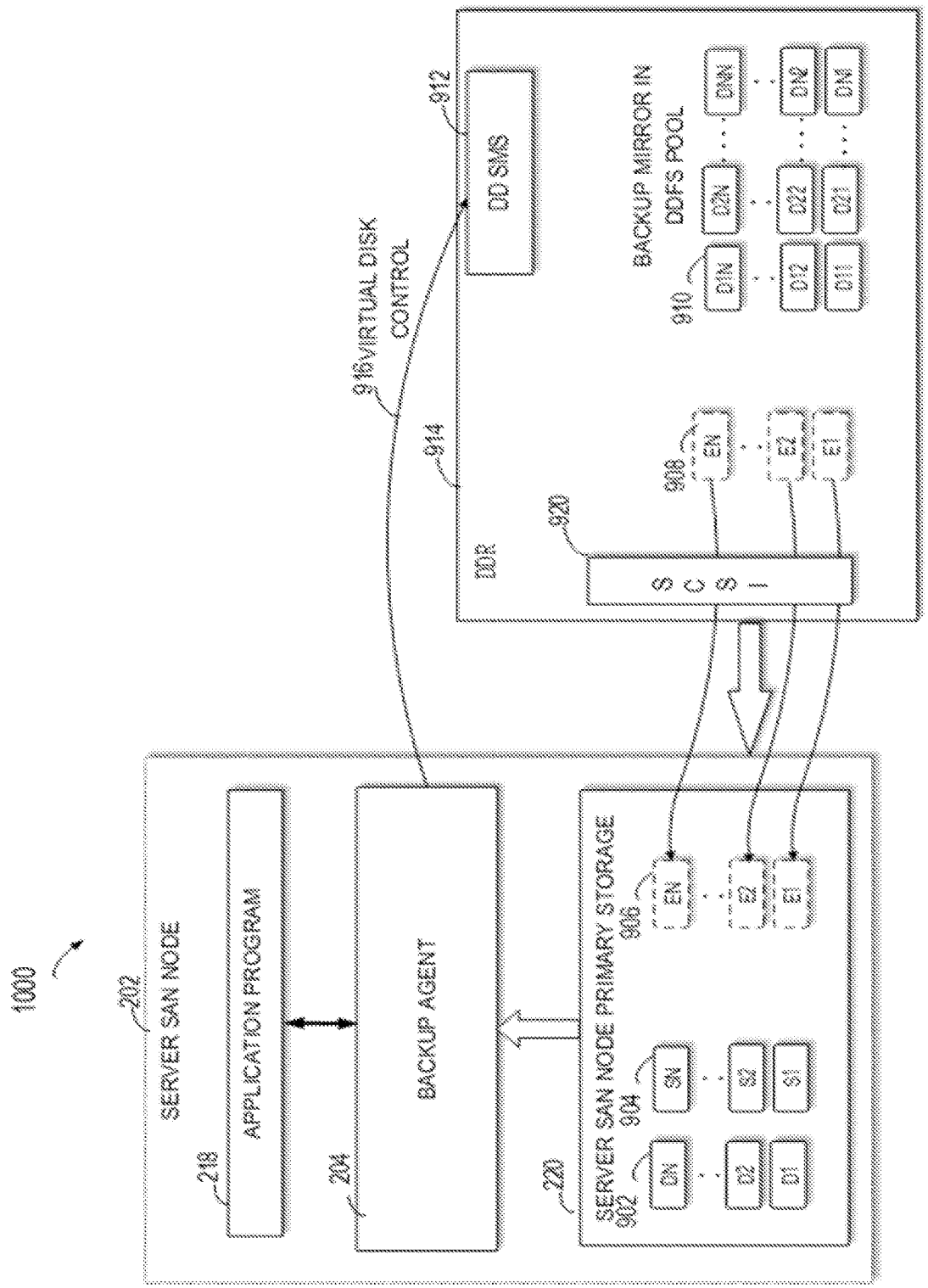
FIG. 10 illustrates a work flow of data restoration of the server SAN node according to embodiments of the present disclosure.

The work flow of restoring data of the server SAN node will be schematically described with reference to FIG. 10. FIG. 10 illustrates a work flow of data restoration of the server SAN node according to embodiments of the present disclosure. The application program manager can restore the application programs to a previous point-in-time through the agents in the application programs (such as Oracle DB, SQL server). The server SAN node can efficiently migrate related data required for protection back from the DDR of the backup device by transferring only data of the change blocks for selected snapshots. As shown in FIG. 10, upon restoring data of the server SAN node 202, it first selects a backup image to be restored from the DDR914 of the Data Domain system of the target device. The backup agent 204 communicates via the virtual disk control command with the DD storage management sub-system DD SMS 912 of the DDR914 of the target backup device. The DDR of the target backup device performs, in accordance with the I/O flow of data read shown by FIG. 7, loading the corresponding image to the DD block device (such as virtual disk LUN, i.e., 908). Then, the Data Domain system of the target device exports the expected data via the standard SCSI interface (FC or IP) to the exported blocks, e.g., backing up and mapping the virtual disk, i.e., backing up and mapping the LUN 906. The exported block in the DDR looks like an internal unit of the server SAN node, but all of its data is stored on the Data Domain system of the target device. Afterwards, the server SAN node 202 can access the DDR exported block through the tiered storage, e.g., backing up and mapping the virtual disk, i.e., backing up and mapping the LUN 906, and load expected snapshots exported from the Data Domain system of the target device, and overwrite the existing data on the server SAN device. Then, the restored data is provided for the application program host. During the restoration process, the server SAN node 202 can only copy the changed data to accelerate the process of data restoration.

Figure 11:
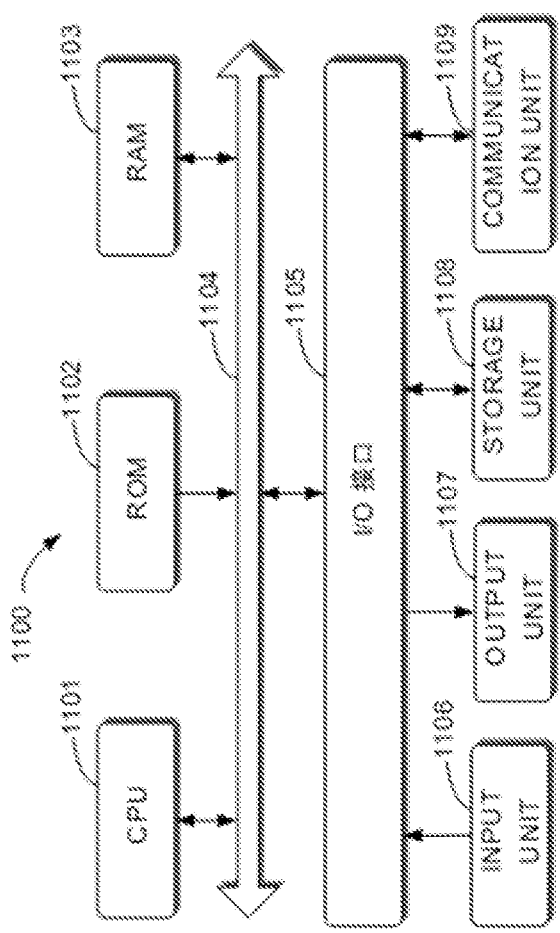
FIG. 11 illustrates a block diagram of an electronic device 1100 suitable for implementing embodiments of the present disclosure.

FIG. 11 schematically illustrates a block diagram of an electronic device 1100 suitable for implementing embodiments of the present disclosure. The device 1100 can be used for implementing the server SAN node 202 of FIG. 2 or one or more hosts in the backup device 222. As shown, the device 1100 includes a central process unit (CPU) 1101, which can execute various suitable actions and processing based on the computer program instructions stored in the read-only memory (ROM) 1102 or computer program instructions loaded in the random-access memory (RAM) 1103 from the storage unit 1108. The RAM 1103 can also store all kinds of programs and data required by the operation of the device 1100. CPU 1101, ROM 1102 and RAM 1103 are connected to each other via a bus 1104. The input/output (I/O) interface 1105 is also connected to the bus 1104.

A plurality of components in the device 1100 is connected to the I/O interface 1105, including: an input unit 1106, such as keyboard, mouse and the like; an output unit 1107, e.g., various kinds of display and loudspeakers etc.; a storage unit 1108, such as disk and optical disk etc.; and a communication unit 1109, such as network card, modem, wireless transceiver and the like. The communication unit 1109 allows the device 1100 to exchange information/data with other devices via the computer network, such as Internet, and/or various telecommunication networks.

The processing unit 1101 executes the above described each method and process, such as executing the method 400, 500, 600 and 700 for controlling data backup. For example, in some embodiments, the method 400, 500, 600 and 700 can be implemented as a computer software program stored in the machine-readable medium, e.g., storage unit 1108. In some embodiments, the computer program can be partially or fully loaded and/or mounted to the device 1100 via ROM 1102 and/or communication unit 1109. When the computer program is loaded to RAM 1103 and executed by the CPU 1101, one or more actions of the above described method 400, 500, 600 and 700 can be implemented. Alternatively, CPU 1101 can be configured by any other suitable ways (such as, by means of the firmware) to execute one or more actions of the method 400, 500, 600 and 700 in other embodiments.

The present disclosure can be method, apparatus, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (device) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processor of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is only exemplary rather than exhaustive and is not limited to the embodiments of the present disclosure. Many modifications and alterations, without deviating from the scope and spirit of the explained various embodiments, are obvious for those skilled in the art. The selection of terms in the text aims to best explain principles and actual applications of each embodiment and technical improvements made in the market by each embodiment, or enable those ordinary skilled in the art to understand embodiments of the present disclosure.

The above description is only optional embodiments of the present disclosure and should not limit the present disclosure. For those skilled in the art, the present disclosure can have various modifications and alterations. Any made amendments, equivalent substitutions, improvements and the like, as long as they are within the spirit and the principle of the present disclosure, should be included in the protection scope of the present disclosure.

We claim:

1. A method, comprising:
   obtaining a usage condition and a health condition of a backup device;
   reporting the obtained usage condition and health condition to a backup agent in a server storage area network (SAN) node connected with the backup device; and
   in response to detecting a virtual disk control command from the server SAN node, controlling a virtual disk interface of the backup device such that data within a logic unit number (LUN) required for protection of the server SAN node is backed up to the backup device or restored from the backup device, the virtual disk interface providing an interface to a virtual disk of the backup device based on a predetermined binding relationship between the LUN and the virtual disk, the predetermined binding relationship determined by a membership managing module of the backup agent upon system startup.

2. The method of claim 1, wherein the virtual disk interface is a Small Computer System Interface (SCSI) of a data protection device and wherein the backing up or restoration comprises:
   in response to detecting the virtual disk control command, activating a read/write from/to the virtual disk interface; and
   converting, via the SCSI, a read/write command from the server SAN node for the SCSI into a read/write request for a file system.

3. The method of claim 2, wherein the converting comprises:
   performing the converting based on a path mapping between the virtual disk and a file of the file system.

4. The method of claim 2, wherein the converting comprises:
   in response to a storage management sub-system of the backup device receiving the virtual disk control command from the server SAN node, performing the converting.

5. The method of claim 1, further comprising implementing the predetermined binding relationship by a tiered storage service of a server SAN that includes the server SAN node.

6. The method of claim 1, further comprising the server SAN node binding the LUN with the virtual disk.

7. The method of claim 1,
   wherein the backup device further includes a plurality of virtual disks,
   wherein the server SAN node further includes a plurality of LUNs,
   wherein each virtual disk in the plurality of virtual disks has a predetermined binding relationship with a respective LUN in the plurality of LUNs, and
   wherein the method further comprises selecting a LUN in the plurality of LUNs as the LUN required for protection.

8. The method of claim 7,
   wherein the backup device includes a file system and a physical storage unit,
   wherein the virtual disk control command includes a read/write command from the server SAN node, and
   wherein controlling a virtual disk interface of the backup device such that data within a logic unit number (LUN) required for protection of the server SAN node is backed up to the backup device or restored from the backup device further includes:
      receiving the read/write command from the server SAN node via the virtual disk interface;
      converting the read/write command from the server SAN node into a read/write command for the file system;

converting the read/write command for the file system into a read/write command for the physical storage unit; and returning a response to the server SAN node.

9. A backup device, comprising:

a memory configured to store one or more programs; and a processing unit coupled to the memory and configured to execute the one or more programs to cause the device to perform acts comprising:

obtaining a usage condition and a health condition of the backup device;

reporting the obtained usage condition and health condition to a backup agent in a server storage area network (SAN) node connected with the backup device; and in response to detecting a virtual disk control command from the server SAN node, controlling a virtual disk interface of the backup device, such that data within a logic unit number (LUN) required for protection of the server SAN node is backed up to the backup device or restored from the backup device, the virtual disk interface providing an interface to a virtual disk of the backup device based on a predetermined binding relationship between the LUN and the virtual disk, the predetermined binding relationship determined by a membership managing module of the backup agent upon system startup.

10. The backup device of claim 9, wherein the virtual disk interface is a Small Computer System Interface (SCSI) of a data protection device, and wherein the backing up or restoration comprises:

in response to detecting the virtual disk control command, activating a read/write from/to the virtual disk interface; and converting, via the SCSI, a read/write command from the server SAN node for the SCSI into a read/write request for a file system.

11. The backup device of claim 10, wherein the converting comprises:

performing the converting based on a path mapping between the virtual disk and a file of the file system.

12. The backup device of claim 10, wherein the converting comprises:

in response to a storage management sub-system of the backup device receiving the virtual disk control command from the server SAN node, performing the converting.

13. The backup device of claim 9, wherein the method further comprises implementing the predetermined binding relationship by a tiered storage service of a server SAN that includes the server SAN node.

14. The backup device of claim 9, wherein the method further comprises the server SAN node binding the LUN with the virtual disk.

15. A computer program product including a non-transient computer-readable medium that stores machine-executable instructions which, when executed, cause a machine to perform steps a method, comprising:

obtaining a usage condition and a health condition of a backup device;

reporting the obtained usage condition and health condition to a backup agent in a server storage area network (SAN) node connected with the backup device; and in response to detecting a virtual disk control command from the server SAN node, controlling a virtual disk interface of the backup device such that data within a logic unit number (LUN) required for protection of the server SAN node is backed up to the backup device or restored from the backup device, the virtual disk interface providing an interface to a virtual disk of the backup device based on a predetermined binding relationship between the LUN and the virtual disk, the predetermined binding relationship determined by a membership managing module of the backup agent upon system startup.

16. The computer program product of claim 15, wherein the virtual disk interface is a Small Computer System Interface (SCSI) of a data protection device, and wherein the backing up or restoration comprises:

in response to detecting the virtual disk control command, activating a read/write from/to the virtual disk interface; and converting, via the SCSI, a read/write command from the server SAN node for the SCSI into a read/write request for a file system.

17. The computer program product of claim 16, wherein the converting comprises:

performing the converting based on a path mapping between the virtual disk and a file of the file system.

18. The computer program product of claim 16, wherein the converting comprises:

in response to a storage management sub-system of the backup device receiving the virtual disk control command from the server SAN node, performing the converting.

19. The computer program product of claim 15, wherein the method further comprises implementing the predetermined binding relationship by at least one of (i) a tiered storage service of a server SAN that includes the server SAN node or (ii) the server SAN node.

* * * * *